United States Patent Office 3,850,950
Patented Nov. 26, 1974

3,850,950
BENZENESULFONYL UREAS AND PROCESS FOR THEIR MANUFACTURE
Walter Aumuller, Kelkheim, Taunus, Rudi Weyer, Frankfurt am Main, Volker Hitzel, Lorsbach, Taunus, and Manfred Hubner, Ludwigshafen (Rhine), Germany, assignors to Farbwerke Hoechst Aktiengesellschaft vormals Meister Lucius & Bruning, Frankfurt am Main, Germany
No Drawing. Filed May 24, 1973, Ser. No. 363,414
Claims priority, application Germany, May 26, 1972,
P 22 25 544.3
Int. Cl. C07d 85/48
U.S. Cl. 260—307 D                                7 Claims

ABSTRACT OF THE DISCLOSURE

Sulfonyl ureas with hypoglycemic properties having the formula

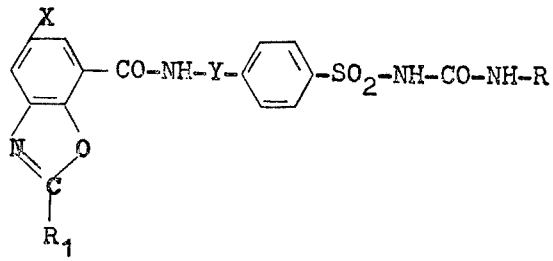

in which $R_1$ is hydrogen, methyl, ethyl, phenyl, X is hydrogen, chlorine, bromine or methyl, Y is

—CH(CH$_3$)—CH$_2$—,

—CH$_2$—CH(CH$_3$)— or, preferably, —CH$_2$—CH$_2$—, R is alkyl having from 3 to 6 carbon atoms, cycloalkyl, alkylcycloalkyl, cycloalkylalkyl, cycloalkenyl, alkylcycloalkenyl each having from 5 to 9 carbon atoms, cyclohexanylmethyl, chlorocyclohexyl, bicycloheptenylmethyl, bicycloheptylmethyl, bicycloheptenyl, bicycloheptyl, nortricyclyl, adamantyl and phenylalkyl having from 1 to 2 alkyl carbon atoms and their physiologically tolerable salts and process for their manufacture.

---

This invention relates to benzenesulfonyl ureas and a process for their manufacture.

The present invention provides sulfonyl ureas of the formula I

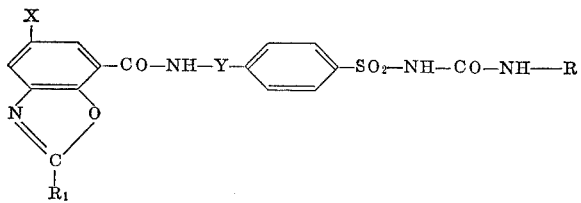

in which $R_1$ is hydrogen, methyl, ethyl, phenyl,
X is hydrogen, chlorine, bromine or methyl,
Y is the group —CH(CH$_3$)—CH$_2$, —CH$_2$—CH(CH$_3$)— or, preferably, —CH$_2$—CH$_2$—,
R is alkyl having from 3 to 6 carbon atoms, cycloalkyl, alkylcycloalkyl, cycloalkylalkyl, cycloalkenyl, alkylcycloalkenyl each carrying from 5 to 9 carbon atoms, cyclohexenylmethyl, chlorocyclohexyl, bicycloheptenylmethyl, bicycloheptylmethyl, bicycloheptenyl, bicycloheptyl, nortricyclyl, adamantyl and phenylalkyl carrying from 1 to 2 alkyl carbon atoms and their physiologically tolerable salts.

The compounds of the above formula have, in themselves or in the form of their salts, a strong and long-lasting hypoglycemic action.

The present invention furthermore relates to a process for the manufacture of these benzenesulfonyl ureas, which comprises (a) reacting benzenesulfonyl carbamic acid esters, benzenesulfonyl thiolcarbamic acid esters, benzenesulfonyl ureas, benzenesulfonyl semicarbazides or benzenesulfonyl semicarbazones which are substituted in the 4-position by the group

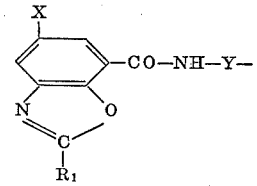

with an amine R—NH$_2$ or a salt thereof or reacting sulfonamides of the formula

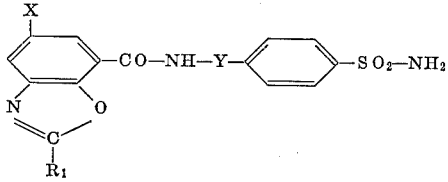

or the salts thereof with R-substituted isocyanates, carbamic acid esters, thiolcarbamic acid esters, carbamic acid halides or ureas;

(b) replacing in correspondingly substituted benzenesulfonylthioureas the sulfur atom by the oxygen atom, (c) adding water to correspondingly substituted benzenesulfonylcarbodiimides, (d) introducing in benzenesulfonyl ureas of the formula

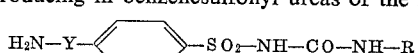

by acylation the radical

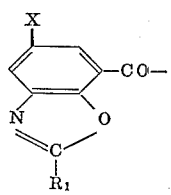

and if desired treating the reaction products with alkaline agents for salt formation.

The aforesaid benzenesulfonyl-carbamic acid esters or benzenesulfonylthiolcarbamic acid esters may carry in the alcoholic component an alkyl group or an aryl group or even a heterocyclic radical. Since this radical is split off during the reaction, its chemical constitution has no influence on the nature of the final product and may, therefore, be varied within wide limits. The same applies to N-R-substituted carbamic acid esters of the corresponding thiolcarbamic acid esters.

As carbamic acid halides, the chlorides are preferably used.

The benzenesulfonyl-ureas used as starting materials in the process of the present invention may be substituted at the nitrogen atom of the urea group not joined to the sulfonyl group. Since these substituents are split off during the reaction with amines their nature can be varied within wide limits. In addition to benzenesulfonyl-ureas which carry alkyl, aryl, acyl or heterocyclic substituents, there may also be used benzenesulfonyl-carbamoyl-imidazoles and similar compounds or bis(benzenesulfonyl)-ureas which may carry at one of the nitrogen atoms a further substituent, for example a methyl group. For example, such bis-(benzenesulfonyl)-ureas or N-benzenesulfonyl-N'-acyl-ureas may be treated with R-substituted amines and the salts thus obtained may be heated to elevated temperatures, especially to above 100° C.

Furthermore, it is possible to start from R-substituted ureas or from R-substituted ureas which are mono- or, especially, disubstituted at the free nitrogen atom and to react them with benzenesulfonamides carrying the substituent

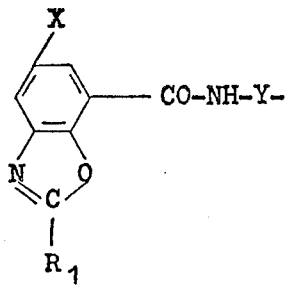

in 4-position.

As such starting materials, there may be used, for example, N-cyclohexyl-urea, the corresponding N'-acetyl, N'-nitro, N'-cyclohexyl, N',N'-diphenyl (in which case the two phenyl radicals may also be substituted or be linked with each other either directly or by means of a bridge member such, for example, as —$CH_2$—, —NH—, —O— or —S—), N'-methyl-N'-phenyl, N',N'-dicyclohexyl-ureas as well as cyclohexyl-carbamoyl-imidazoles, -pyrazoles or -triazoles and compounds which carry, instead of the cyclohexyl group, another substituent within the range of the above definition of R.

The replacement of the sulfur atom in the urea grouping of the correspondingly substituted benzenesulfonyl-thioureas by an oxygen atom can be effected in known manner, for example, with the aid of an oxide or a salt of a heavy metal or with the use of an oxidizing agent, such, for example, as hydrogen peroxide, nitrous acid or a permanganate.

Benzenesulfonyl carbodiimides may suitably be converted into sulfonyl ureas by addition of water in a solvent miscible with water which does not itself react with carbodiimides, for example, dioxane or dimethyl formamide or tetrahydrofurane. The sulfonyl carbodiimides may be obtained by various methods, for example, by means of dicyclohexylcarbodiimide in dioxane solution from the corresponding sulfonylthio ureas.

As regards the reaction conditions, the manner of carrying out the process of the invention may in general be varied within wide limits, and can be adapted to each individual case. For example, the reactions may be carried out with the use of a solvent or without a solvent, at room temperature or at an elevated temperature.

Depending on the nature of the starting substances, one or the other of the aforesaid methods may, in some cases, provide a desired benzenesulfonyl-urea only in a small yield or may be inappropriate for its synthesis. In such comparatively rare cases, the expert will have no difficulty in synthesizing the desired product according to one of the other methods of the process described.

The benzenesulfonyl-urea derivatives of the invention are valuable medicaments which have a strong and long-lasting hypoglycemic action.

The hypoglycemic action of the compounds of the invention can be ascertained by administering them, while suspended in starch mucus, to normally fed rabbits in a dose of 10 mg./kg. of body weight and determining the blood sugar level over a prolonged period of time by the method of Hagedorn-Jensen or by means of an auto-analyzer.

The following Table shows the hypoglycemic activity of a compound of the invention:

TABLE

Lowering of the blood sugar level of rabbits after oral administration of 10 mg./kg. of N-[4-($\beta$-<5-chloro-2-methylbenzoxazol - 7 - carboxamido>-ethyl)-benzenesulfonyl]-N'-4-methyl-cyclohexyl urea after . . . hours:

| | |
|---|---|
| 3 | 30 |
| 6 | 35 |
| 24 | 38 |
| 48 | -- |
| 72 | 12 |
| 96 | 0 |

The benzenesulfonyl ureas of the present invention are preferably used for the manufacture of orally administrable pharmaceutical preparations and for the lowering of the blood sugar level in the treatment of diabetes mellitus, and may be used as such or in the form of their physiologically tolerable salts or in the presence of substances which cause salt formation. For the formation of salts, there may be used, for example, alkaline agents, for example, alkali metal- or alkaline earth metal hydroxides and alkali metal or alkaline earth metal carbonates or bi-carbonates.

The present invention also provides pharmaceutical preparations for oral administration and lowering the blood sugar level in the treatment of diabetes mellitus, which comprises a compound of the above formula I or a physiologically tolerable salt thereof in admixture or conjunction with a pharmaceutically suitable carrier. As pharmaceutically suitable carriers there may be mentioned, for example, talc, starch, lactose, tragacanth and magnesium stearate. The pharmaceutical preparations of the invention are preferably formulated as tablets.

A pharmaceutical preparation, for example, a tablet or a powder, comprising a benzenesulfonyl-urea of the invention or a physiologically tolerable salt thereof as the active substance, with or without one or more of the aforementioned carriers, is advantageously brought into a suitable dosage unit form. The dose chosen should comply with the activity of the benzenesulfonyl-urea and with the desired effect. Advantageously, the dosage per unit amounts to from about 0.5 to 100 mg., preferably from 2 to 10 mg., but considerably higher or lower dosage units may also be used, which, when required, are divided or multiplied prior to their administration.

The following Examples illustrate the invention:

EXAMPLE 1

N-[4-($\beta$-<5-chloro-2-methyl-benzoxazol-7-carboxamido>-ethyl)-benzenesulfonyl]-N'-cyclohexyl urea 7.86 g. of 4-($\beta$-<5-chloro-2-methyl-benzoxazol-7-carboxamido>-ethyl)-benzenesulfonamide (m.p. 233–234°). —5.52 g. of potassium carbonate and 150 ml. of acetone were boiled under reflux for 6 hours while stirring.

Then, 2.5 g. of cyclohexylisocyanate were added dropwise and the mixture was stirred again for 8 hours at the boiling temperature. After allowing it to dwell overnight it was suction-filtered and the crystallite obtained was treated with dilute hydrochloric acid. A crude product of N-[4-($\beta$-<5-chloro - 2 - methyl-benzoxazol-7-carboxamido>-ethyl)-benzenesulfonyl]-N'-cyclohexyl urea was obtained which was suction-filtered and purified by dissolution in dilute $NaHCO_3$-solution, filtration of the solution and reprecipitation with dilute hydrochloric acid. The so obtained crystallite of N-[4-($\beta$-<5-chloro-2-methyl-benzoxazol-7-carboxamido>-ethyl)-benzenesulfonyl] - N' - cyclohexyl urea was suction-filtered, washed with acetone and dried.

Melting point 195–197° C.

In an analogous manner there was obtained from 4-(β-<5-chloro - 2 - methyl-benzoxazol-7-carboxamido>-ethyl)-benzenesulfonamide using (a) 4-methyl-cyclohexylisocyanate (trans) the N[-4-(β - <5-chloro - 2 - methyl-benzoxazol-7-carboxamido>-ethyl)-benzenesulfonyl] - N' - 4 - methylcyclohexyl urea (trans), m.p. 174 to 176° C. (from methanol)

(b) (n)-butylisocyanate the

N-[4 - (β -< 5 - chloro - 2 - methyl-benzoxazol-7-carboxamido> - ethyl) - benzenesulfonyl] - N' - (n)-butyl urea, m.p. 108° C.

(c) 3-cyclohexenylisocyanate the

N - [4 - (β - <5 - chloro - 2 - methyl-benzoxazol-7-carboxamido> - ethyl) - benzenesulfonyl] - N' - Δ3-cyclohexenyl-urea, m.p. 197 to 199° C. (from methanol)

(d) cycloheptylisocyanate the

N - [4 - (β - <5 - chloro - 2 - methyl-benzoxazol-7-carboxamido> - ethyl) - benzenesulfonyl] - N' - cycloheptyl-urea, m.p. 169 to 171° C. (from methanol)

(e) cyclopentylisocyanate the

N - [4 - (β - <5 - chloro - 2 - methyl-benzoxazol-7-carboxamido> - ethyl) - benzenesulfonyl] - N' - cyclopentyl-urea, m.p. 200 to 202° C. (from methanol)

(f) 2,5-endoethylenecyclohexylisocyanate the

N - [4 - (β - <5 - chloro - 2 - methylbenzoxazol-7-carboxamido>-ethyl) - benzenesulfonyl]- N' - (2,5 - endoethylenecyclohexyl)-urea, m.p. 160 to 162° C.

(g) β-phenylethylisocyanate the

N - [4 - (β - <5 - chloro - 2 - methyl-benzoxazol-7-carboxamido>-ethyl) - benzenesulfonyl] - N' - β-phenylethylurea, m.p. 132 to 134° C.

(h) propylisocyanate the

N - [4 - (β - <5 - chloro - 2 - methylbenzoxazol-7-carboxamido> - ethyl) - benzenesulfonyl] - N' - propyl-urea, m.p. 186 to 188° C. (from methanol)

(i) 4-ethyl-cyclohexylisocyanate the

N - [4 - (β - <5 - chloro - 2 - methylbenzoxazol-7-carboxamido> - ethyl) - benzenesulfonyl] - N' - (4 - ethylcyclohexyl)urea, m.p. 191 to 193° C. (from methanol)

(k) 4-chlorocyclohexylisocyanate the

N - [4 - (β - <5 - chloro-2-methylbenzoxazol-7-carboxamido> - ethyl) - benzenesulfonyl] - N' - (4-chlorocyclohexyl)-urea, m.p. 167 to 169° C. (from methanol).

The 4 - (β - <5 - chloro-2-methyl-benzoxazol-7-carboxamido> - ethyl) - benzenesulfonamide (m.p. 233 to 234° C.) mentioned in the preceding examples may be obtained, for example, by reacting 4 - (β - aminoethyl)-benzenesulfonamide and 5 - chloro - 2 - methyl-benzoxazol - 7 - carboxylic acid (m.p. 287–288° C.) by reacting them as mixed anhydride in a manner known by itself with the amine.

(h) In an analogous manner there was obtained from 4 - (β - <2,5 - dimethylbenzoxazol - 7 - carboxamido>-ethyl) - benzenesulfonamide (m.p. 236–238° C.) using cyclohexylisocyanate the N - [4 - (β - <2,5 - dimethylbenzoxazol - 7 - carboxamido> - ethyl)-benzenesulfonyl]-N' - cyclohexyl urea [m.p. 221 to 223° C. from isopropanol/dioxane)].

The sulfonamide mentioned can be obtained by reacting, for example, 2,5 - dimethyl - benzoxazol-7-carboxylic acid (m.p. 253 to 256° C.) as mixed anhydride, in a manner known by itself, with β-aminoethylbenzenesulfonamide.

In an analogous manner, there were obtained from 4-(β-<2-methylbenzoxazol - 7 - carboxamido> - ethyl)-benzenesulfonamide (m.p. 200 to 202° C.) using (i) cyclohexylisocyanate the N - [4 - (β - <2 - methyl - benzoxazol-7-carboxamido>-ethyl) - benzenesulfonyl] - N' - cyclohexyl urea, m.p. 188 to 190° C.

(j) 4-methylcyclohexyl-isocyanate (trans) the

N - [4 - (β - <2 - methyl - benzoxazol-7-carboxamido>-ethyl) - benzenesulfonyl] - N' - 4 - methyl-cyclohexyl urea (trans), m.p. 205 to 207° C.

4 - (β - <2 - methyl - benzoxazol-7-carboxamido>-ethyl) - benzenesulfonamide (m.p. 200 to 202° C.) can be obtained, for example, by reacting 2 - methyl - benzoxazol-7-carboxylic acid (m.p. 245° C.) in the form of the mixed anhydride with 4 - (β - aminoethyl)-benzenesulfonamide.

EXAMPLE 2

N-[4-(β-<2-ethyl-5-chloro-benzoxazol-7-carboxamido>-ethyl)-benzenesulfonyl]-N'-cyclohexyl-urea In an analogous manner as described in Example 1 there was obtained, using 4 - (β - <2 - ethyl - 5 - chlorobenzoxazol - 7 - carboxamido> - ethyl) - benzenesulfonamide (m.p. 214 to 216° C.) and cyclohexylisocyanate the N - [4 - (β - <2 - ethyl - 5 - chloro-benzoxazol-7-carboxamido> - ethyl) - benzenesulfonyl] - N' - cyclohexyl urea, m.p. 190 to 192° C. (from methanol).

The sulfonamide used can be obtained, for example, from 4 - (β - aminoethyl) - benzenesulfonamide and 2-ethyl - 5 - chlorobenzoxazol - 7 - carboxylic acid (m.p. 235 to 238° C.) by reacting it in the form of a mixed anhydride in known manner with amine.

In an analogous manner, there was obtained from 4-(β-<2 - ethyl - 5 - chloro - benzoxazol - 7 - carboxamido>-ethyl) - benzenesulfonamide and 4 - methylcyclohexylisocyanate (trans) the N - [4 - (β-<2 - ethyl - 5 - chlorobenzoxazol - 7 - carboxamido> - ethyl)-benzenesulfonyl]-N' - 4 - methyl - cyclohexyl - urea (trans), m.p. 176.5 to 178.5° C. (from acetic acid ester).

EXAMPLE 3

N - [4 - (β - <5 - chloro-2-phenyl-benzoxazol-7-carboxamido> - ethyl) - benzenesulfonyl] - N' - 4 - methylcyclohexyl urea In an analogous manner as described in Example 1 and using 4 - (β - <5 - chloro - 2 - phenyl-benzoxazol-7-carboxamido> - ethyl) - benzenesulfonamide (m.p. 314–316° C.) and 4 - methyl - cyclohexyl - isocyanate (trans) the N - [4 - (β - <5 - chloro - 2 - phenyl-benzoxazol-7-carboxamido> - ethyl) - benzenesulfonyl] - N' - 4-methylcyclohexyl urea (trans), m.p. 242 to 244° C. was obtained.

The sulfonamide used was obtained in the manner described from 4 - (β - aminoethyl) - benzenesulfonamide and 5 - chloro - 2 - phenyl - benzoxazol-carboxylic acid (m.p. 300 to 302° C.).

EXAMPLE 4

N-[4-(β-<2-methyl-benzoxazol-7-carboxamido>-ethyl)-benzenesulfonyl-N'-cyclohexylmethyl urea 3.6 g. of 4 - (β - <2 - methyl - benzoxazol - 7 - carboxamido> - ethyl) - benzenesulfonamide (m.p. 200 to 202° C.) and 2.76 g. of potassium carbonate were boiled with 100 ml. of acetone and converted into the potassium salt of the N - [4 - (β - <2 - methyl - benzoxazol-7-carboxamido> - ethyl) - benzenesulfonyl] - N' - cyclohexylmethyl - thiourea by adding dropwise cyclohexyl-methylisothiocyanate and further boiling for 8 hours. After suction-filtering of the potassium salt and by adding dilute hydrochloric acid the N - [4 - (β - <2 - methyl-benzoxazol - 7 - carboxamido> - ethyl) - benzenesulfonyl]-N'-cyclohexyl - methyl - thiourea was obtained which melted at m.p. 178–180° C. after recrystallization from methanol.

2.3 g. of the thio urea so obtained were suspended in 250 ml. of acetone. The suspension was cooled to 10° C. and a solution of 0.4 g. of NaNO₂ in 10 ml. of water was added dropwise. To the solution so obtained 12 ml. of 5 N acetic acid were added. After a 2 hours' stirring while cooling with ice the mixture was filtered. The filtrate was condensed to one third of its volume and water was added. The precipitate which was separated was reprecipitated by dissolving in sodium bicarbonate solution, by filtration and acidification to be purified.

The N-[4-(β-<2-methyl-benzoxazol-7-carboxamido>-ethyl)-benzenesulfonyl] - N' - cyclohexyl-methyl urea melted at 160 to 162° C. after recrystallization from methanol.

In an analogous manner there was obtained from N-[4-(β-<2-methyl-benzoxazol - 7 - carboxamido>-ethyl)-benzenesulfonyl] - N' - (2,5-endomethylene-cyclohexylmethyl)-thiourea (m.p. 186 to 188° C. from methanol) the N-[4-(β-<2-methyl-benzoxazol - 7 - carboxamido>-ethyl)-benzenesulfonyl] - N' - (2,5-endomethylenecyclohexyl-methyl)-urea, m.p. 188 to 190° C. from methanol.

EXAMPLE 5

N-[4-(β-<5-chloro - 2 - methyl-benzoxazol - 7 - carboxamido>-ethyl)-benzenesulfonyl]-N' - 4 - methyl-cyclohexyl urea (trans)

5.3 g. of N-[4-(β-<5-chloro-2-methyl-benzoxazol-7-carboxamido>-ethyl)-benzenesulfonyl] - methylurethane (prepared from the corresponding sulfonamide with methyl-chloroformate, m.p. 136 to 138° C.), 150 ml. of dioxane and 1.4 g. of 4-methyl-cyclohexylamine (trans) were heated for 1 hour under reflux to boiling. The mixture was condensed in vacuo and the residue so obtained was introduced in highly dilute aqueous sodium hydrogen carbonate and filtered. By precipitating with hydrochloric acid the crude N-[4-(β-<5-chloro-2-methyl-benzoxazol-7-carboxamido>-ethyl)-benzenesulfonyl] - N' - 4-methyl-cyclohexyl-urea (trans) was obtained from the filtrate. The substance melted at 174 to 176° C. after recrystallization from methanol.

In an analogous manner, there were obtained:

N-[4-(β-<5-chloro-2-methylbenzoxazol-7-carboxamido>-ethyl)-benzenesulfonyl]-N'-cyclooctyl urea, m.p. 125 to 127° C. (from methanol)

N-[4-(β-<5-chloro-2-methylbenzoxazol-7-carboxamido>-ethyl)-benzenesulfonyl]-N'-(4-isopropyl cyclohexyl)-urea, m.p. 200–202° C. (from methanol/dioxane)

N-[4-(β-<5-chloro-2-methylbenzoxazol-7-carboxamido>-ethyl)-benzenesulfonyl]-N'-cyclohexylmethyl urea, m.p. 207–209° C. (from methanol/dioxane)

N-[4-(β-<5-chloro-2-methylbenzoxazol-7-carboxamido>-ethyl)-benzenesulfonyl]-N'-(bicyclo[2.2.1]hept-2-yl)-urea, m.p. 162–164° C. (from methanol)

N-[4-(β-<5-chloro-2-methylbenzoxazol-7-carboxamido>-ethyl)-benzenesulfonyl]-N'-(bicyclo[2.2.1]hept-2-yl-methyl)-urea m.p. 196 to 198° C. (from methanol)

N-[4-(β-<5-chloro-2-methylbenzoxazol-7-carboxamido>-ethyl)-benzenesulfonyl]-N'-(3-ethylcyclopentyl)-urea, m.p. 141–143° C. (from methanol)

N-[4-(β-<5-chloro-2-methylbenzoxazol-7-carboxamido>-ethyl)-benzenesulfonyl]-N'-(cyclohex-3-enylmethyl)-urea, m.p. 194–196° C. (from methanol)

N-[4-(β-<5-chloro-2-methylbenzoxazol-7-carboxamido>-ethyl)-benzenesulfonyl]-N'-nortricyclyl urea, m.p. 164–166° C. (from methanol/dioxane)

What is claimed is:

1. Sulfonyl ureas of the formula

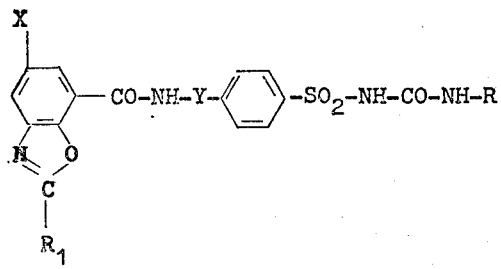

in which

R₁ is hydrogen, methyl, ethyl, phenyl,
X is hydrogen, chlorine, bromine or methyl,
Y is —CH(CH₃)—CH₂—, —CH₂—CH(CH₃)— or, preferably, —CH₂—CH₂—,
R is alkyl having from 3 to 6 carbon atoms, cycloalkyl, alkylcycloalkyl, cycloalkylalkyl, cycloalkenyl, alkylcycloalkenyl each having from 5 to 9 carbon atoms, cyclohexenylmethyl, chlorocyclohexyl, bicycloheptenylmethyl, bicycloheptylmethyl, bicycloheptenyl, bicycloheptyl, nortricyclyl, adamantyl and phenylalkyl having from 1 to 2 alkyl carbon atoms and the physiologically tolerable salts thereof.

2. The compound of claim 1 which is N-[4-(β-<2-methyl-5-chlorobenzoxazol - 7 - carboxamido>-ethyl)-benzenesulfonyl]-N'-cyclohexyl urea.

3. The compound of claim 1 which is N-[4-(β-<2-methyl-5-chlorobenzoxazol-7-carboxamido>-ethyl) - benzenesulfonyl]-N'-4-methylcyclohexyl urea.

4. The compound of claim 1 which is N-[4-(β-<2-methylbenzoxazol - 7 - carboxamido>-ethyl)-benzenesulfonyl]-N'-4-methylcyclohexyl urea.

5. The compound of claim 1 which is N-[4-(β-<5-chloro-2-methylbenzoxazol - 7 - carboxamido>-ethyl)-benzenesulfonyl]-N'-3-ethylcyclopentyl urea.

6. The compound of claim 1 which is N-[4-(β-<5-chloro-2-methylbenzoxazol - 7 - carboxamido>-ethyl)-benzenesulfonyl]-N' - 4 - isopropyl-cyclohexyl urea.

7. The compound of claim 1 which is N-[4-(β-<2-ethyl-5-chlorobenzoxazol - 7 - carboxamido>-ethyl)-benzenesulfonyl]-N'-cyclohexyl urea.

References Cited
UNITED STATES PATENTS 3,668,215   6/1972   Plumpe et al. _____ 260—307 H RAYMOND V. RUSH, Primary Examiner U.S. Cl. X.R.

424—272